US009185472B2

(12) United States Patent
Klemettinen

(10) Patent No.: US 9,185,472 B2
(45) Date of Patent: Nov. 10, 2015

(54) DELIVERY OF IDENTIFICATION INFORMATION

(75) Inventor: Vesa Klemettinen, Muurame (FI)

(73) Assignee: AIRBUS DEFENCE AND SPACE OY, Helsinki (FI)

( * ) Notice: Subject to any disclaimer, the term of this patent is extended or adjusted under 35 U.S.C. 154(b) by 729 days.

(21) Appl. No.: 13/389,036

(22) PCT Filed: Aug. 16, 2010

(86) PCT No.: PCT/FI2010/050636
§ 371 (c)(1),
(2), (4) Date: Mar. 19, 2012

(87) PCT Pub. No.: WO2011/020947
PCT Pub. Date: Feb. 24, 2011

(65) Prior Publication Data
US 2012/0165060 A1 Jun. 28, 2012

(30) Foreign Application Priority Data
Aug. 19, 2009 (EP) ..................................... 09168149

(51) Int. Cl.
*H04W 4/08* (2009.01)
*H04Q 3/72* (2006.01)
(52) U.S. Cl.
CPC ....... *H04Q 3/72* (2013.01); *H04Q 2213/13091* (2013.01); *H04Q 2213/13097* (2013.01); *H04Q 2213/13102* (2013.01); *H04Q 2213/13141* (2013.01); *H04Q 2213/13176* (2013.01); *H04Q 2213/13196* (2013.01); *H04Q 2213/13216* (2013.01); *H04Q 2213/13288* (2013.01)

(58) Field of Classification Search
CPC .......... H04Q 2213/13091; H04Q 2213/13097; H04Q 2213/13102; H04Q 2213/13141; H04Q 2213/13176; H04Q 2213/13196; H04Q 2213/13216; H04Q 2213/13288; H04Q 3/72; H04W 88/16
See application file for complete search history.

(56) References Cited

U.S. PATENT DOCUMENTS

2004/0190468 A1 * 9/2004 Saijonmaa .................... 370/312
2004/0235506 A1 * 11/2004 Roettger et al. ............... 455/502

FOREIGN PATENT DOCUMENTS

WO     WO 01/45335 A1    6/2001
WO     WO 2008/050110 A1  5/2008

OTHER PUBLICATIONS

International Search Report and Written Opinion corresponding to International Application No. PCT/FI2010/050636 dated Nov. 22, 2010.
European Search Report corresponding to European Patent Application No. 09168149.4 dated Feb. 16, 2010.

* cited by examiner

*Primary Examiner* — Fanghwa Wang
(74) *Attorney, Agent, or Firm* — Squire Patton Boggs (US) LLP

(57) ABSTRACT

When a communication session is implemented, the communications of a direct mode terminal may be mediated via a direct mode gateway such that messages of a direct mode first terminal are addressed with identification information of the direct mode gateway. In the invention identity information of a user of the direct mode terminal is delivered to a trunked mode terminal in a user plane signalling message of the communication session. In terminal procedures identity of the direct mode gateway may be replaced by identity information received in the user plane signalling message. Identity of the direct mode terminal is then in a simple manner made available to terminal procedures of the trunked mode terminal.

18 Claims, 4 Drawing Sheets

DELIVERY OF IDENTIFICATION INFORMATION

FIELD OF THE INVENTION

The present invention relates to telecommunications, as specifically to an enhanced mechanism for delivery of identification information.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Telecommunications refers to transmission based communication using electromagnetic systems. A telecommunications system typically comprises a network and a plurality of terminals. The network comprises a set of nodes and links that provide connections between two or more terminals to facilitate telecommunication between them.

In addition to networked communications, some terminals are capable of operating in direct mode by using radio frequencies that are not controlled by the network. During direct mode operations, there is a direct connection between the phones. The network may be aware of the direct mode operations but it does not essentially interfere with the procedures of the communication.

In some systems communications between terminals operating under network control and terminals in direct mode are facilitated by means of a gateway. The gateway is a an entity that is able to interface the network and also to participate in the direct mode communications, either via the interface used between direct mode terminals, or via specific direct mode gateway interface.

Typically such a gateway registers to the network using its own address and in most of the communications operations appears to other terminals as one more terminals in the network. In most of these situations this is an excellent arrangement; it facilitates information flows between networked and direct mode operations. The term address represents here identification information and refers to formalized information used to unambiguously indicate an identifiable entity in the network. Addressing a message with particular identification information refers thus here to providing a message with an address, which corresponds with the identification information and using the provided address for routing the message in the network. Address may be provided and used in various forms, depending on the applied network protocols.

However, there are communication situations where the arrangement does not work appropriately. For example, some advanced systems provide a specific mechanism by means of which a terminal in a call may display to its user identification information of the party that is presently talking. This feature is especially valuable in systems that provide group communications, where signalling procedures apply group addresses. For a listener a mere group address is not enough, a user needs to know which one of the group members it is currently listening to.

This talking party identification is practicable and widely used, but it has been noted that the procedure is vulnerable to use of the gateway because the address used for talking party identification is derived from the signalling messages associated to the call. Accordingly, when the talking party is a direct mode terminal that operates via the gateway, the talking party identification displayed by the listening terminal is the address of the gateway, not the address of the talking party. Especially in professional systems this is a severe handicap, because the dispatcher typically operates in the network side. It is very important that the dispatcher knows exactly the party he or she is presently communicating with.

This problem has been noticed in European Telecommunications Standards Institute TETRA system in which a feature called Talking Party Identification (TPI) has been specified. ETSI standards propose solving the problem by configuring the gateway to include the address of a transmitting direct mode terminal (DM-MS) as a type 3 element within a layer 3 protocol data unit (PDU). This type 3 element indicates the source direct mode terminal when the gateway sends a message to the network, or the destination direct mode terminal when the gateway receives a message from the network.

Implementation of the ETSI proposed mechanism, however, requires essential modifications to elements in the side of the network and/or trunked mode terminals. Such modifications require a lot of design and testing work and are therefore expensive to implement. This means that since DM-MS address is an optional feature of the ETSI standards, there has not been many implementations that apply the proposed use of type 3 elements in layer 3 PDUs.

The above situation illustrates the more generic problem of identifying direct mode terminals communicating with network terminals via a gateway that applies the same communication interface as the network terminals. In order to direct the messages to itself in the network the gateway has to use its own address in signalling. If identification information of the direct mode terminal behind the gateway needs to be conveyed to a network terminal, it needs to be delivered within an information element of the signaling message. Signalling messages associated to many communication instances in existing systems are not designed to carry such information elements, and introducing new information elements for existing systems and installed system base is very laborious. And even if such provision had been considered already at the design phase, implementation of a characteristic that is probably not widely used is typically not high in the order of implementations.

However, the need definitely exists and for many important use cases and user populations the disadvantages from not being able to identify a party behind the gateway (typically a person in field operations) are significant. A simple and easy to implement solution is therefore needed to appropriately solve the above problem.

SUMMARY

An object of the present invention is thus to provide a method and an apparatus for implementing the method so as to overcome the above problem. This object of the invention is achieved by a method, a terminal, a gateway device, and a computer program product, which are characterized by what is stated in the independent claims. The preferred embodiments of the invention are disclosed in the dependent claims.

The invention is based on complementing conventional identification information derivable from the control plane signalling information with information delivered in a user plane signalling message transmitted over communication resource that is stolen from user traffic between the communicating parties.

The disclosed solution provides a simple and straightforward mechanism for transmission of identification information of participants operating in direct mode. The required information may be delivered by adjustments made, in minimum, only to the peer parties, the talking and the displaying terminals. The proposed methods are thus much easier and economical to implement than prior art solutions.

BRIEF DESCRIPTION OF THE DRAWINGS

In the following, embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any telecommunications system where combination of network controlled communications with communications outside the control of the network is possible. The communication system may be a fixed communication system or a wireless communication system or a communication system utilizing both fixed networks and wireless networks. The protocols, the specifications of communication systems, network nodes and user terminals develop rapidly, especially in wireless communications. Such development may require extra changes to an embodiment. Therefore, all words and expressions should be interpreted broadly as they are intended to illustrate, not to restrict, the embodiment.

Figure 1:
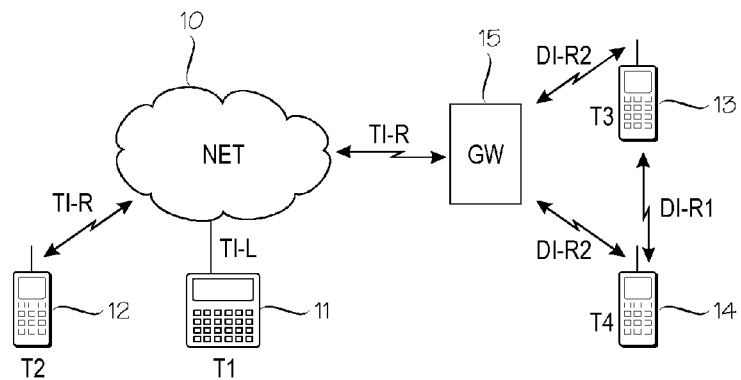
FIG. 1 illustrates an exemplary architecture of a communication system providing trunked and direct mode.

In the following, operations implemented for network controlled communications are referred to as trunked mode operations, and communication operations implemented outside the control of the network are referred to as direct mode operations. An exemplary architecture of a communication system providing trunked and direct mode is illustrated in FIG. 1. FIG. 1 is a simplified system architecture only showing some elements and functional entities, all being logical units whose implementation may differ from what is shown.

FIG. 1 shows a network 10 that represents an interconnection of communicating entities to create a switching and management infrastructure for network controlled communications. The switching and management infrastructure provides telecommunications services applying a pool of operations of these entities and one or more interfaces through which terminals can access these services to communicate with each other. Through the network a terminal can also communicate via other networks with external terminals and servers. The network 10 typically comprises at least one exchange that performs switching functions and controls majority of operations within the network and with other networks. The network 10 may also comprise a number of other network elements, like subscriber databases, servers, operation and management systems, the interworking of which with the exchange facilitates telecommunications services offered by the network in a manner well known to a person skilled in the art.

Access to the services of the network 10 is enabled by network elements that provide one or more communication interfaces for exchanging information via defined medias with terminals. FIG. 1 shows four exemplary terminals 11, 12, 13, 14, 5 of which T1 11 is a fixed terminal that accesses the network 10 via a line interface TI-L. The line interface TI-L represents here a variety of fixed connections that may be implemented, for example, over a wired connection between T1 and a network element that provides the line interface, or over a network connection using an external network interface of the exchange. T2 12 represents here a radio terminal that accesses services of the network 10 via a radio interface TI-R. It is noted that for simplicity FIG. 1 shows only one type TI-R, but a network may naturally provide more than one type of trunked mode radio interfaces to terminals. T3 13 and T4 14 represent here radio terminals that typically provide functions to communicate over TI-R but are also capable of using at least one other radio interface DI-R1 and/or DI-R2 for communicating outside the control of the network 10.

FIG. 1 shows also a gateway element GW 15 that comprises an interface TI-R for trunked mode operations and an interface DI-R2 for direct mode operations and provides thereby gateway connectivity for communications between terminals (for example, T3, T4) in the direct mode and terminals (for example, T1 and/or T2) in the trunked mode.

In the following the principles of the present invention are described by means of a communication system applying Terrestrial Trunked Radio (TETRA) technology. The terms and elements of the TETRA air interface are specified in the European Telecommunication Standards ETSI EN 300 392-2; European Standard (Telecommunications series); Terrestrial Trunked Radio (TETRA); Voice plus Data (V+D); Part 2: Air Interface (AI). The elements of TETRA direct mode operations are described in ETS 300 396-3; European Standard (Telecommunications series); Terrestrial Trunked Radio (TETRA); Technical requirements for Direct Mode Operation (DMO); Part 3: Mobile Station to Mobile Station (MS-MS) Air Interface (AI) protocol. Basics of the gateway operations may be referred from ETSI EN 300 396-5; European Standard (Telecommunications series); Terrestrial Trunked Radio (TETRA); Technical requirements for Direct Mode Operation (DMO); Part 5: Gateway air interface. Due to the exhaustive technical documentation of TETRA, only elements relevant for describing implementation of the invention in the TETRA environment are described in the following. It is noted, however, that TETRA technology is used her only as an example without limiting the invention to this one radio system technology.

In TETRA, direct mode (DM) is implemented as a mode of operation where terminals, here mobile subscriber radio units, may communicate using radio frequencies which can be monitored by, but which are outside the control of, the TETRA network. Direct mode thus can be performed in its specified Ud air interface without intervention of elements of the TETRA switching and management infrastructure.

Referring still to FIG. 1, TETRA direct mode operation with a gateway GW offers the possibility to connect mobile terminals T3, T4 that operate in direct mode to trunked mode communication sessions in the network 10. Typically such a session is an individual call or a group call, but the proposed mechanism is applicable to any type of communications procedure and can be implemented using circuit or packet mode communications. The gateway GW 15 re-transmits information received from a direct mode terminal T3 or T4 on the direct mode air interface (in TETRA called as Ud) to the trunked mode air interface (in TETRA called as Um), or vice versa. The gateway GW 15 anyhow registers and authenticates to the network 10 using its own individual TETRA subscriber identity (ITSI) as its network address. In FIG. 1 a direct mode the radio interface applied in communications between terminals is denoted as DI-R1 and the radio interface applied in communications between terminals and the gateway GW is denoted in DI-R2 to illustrate that in TETRA these radio interfaces are slightly different. This is, however, as such not essential to the invention.

It is noted that the term gateway is used herein as a generic term to describe either a pure direct mode gateway or a combined implementation with a repeater. The repeater is a device that transmits communication signals between radio units in places where radio coverage is not sufficient due to buildings or other obstructions. A device may combine the functions of a DM repeater and a DM gateway in a single implementation such that it is capable of providing both functions simultaneously. This means that during a call transaction initiated by a DM terminal, the device provides gateway connectivity to the TETRA network and also provides a repeater function on the DM channel.

The gateway GW is specifically addressed by a DM terminal T3, T4 if a connection is required to be made with the network 10. The gateway address is in those cases included within the call set-up signalling messages. During its operation, the gateway GW appears to the network 10 as a normal TETRA terminal. When the gateway GW sends a message on behalf of a DM terminal (e.g. a U-SETUP, U-SDS DATA or U-STATUS PDU), it uses its own individual address as the V+D layer 2 address. This means that the gateway GW sends and receives messages for individual direct mode terminals using its own individual address as the layer 2 address of trunked mode. For a group call, the gateway receives group-addressed messages using the normal trunked mode group addressing.

Control plane (C-plane) typically refers to media traffic which carries signalling information. User information is then considered to refer to any other information than control plane messages, and media traffic carrying user information is thus referred to as U-plane traffic. In TETRA, different protocols are applied to C-plane and U-plane messages. Typically, when a user terminal sets up a connection or a session to one or more another endpoints, C-plane signalling ensures that any receiving endpoint may associate user information received during the connection or session to the participating endpoints.

However, in group communications the group address delivered with C-plane information is not always enough. For some operations, a receiving terminal user would also need to know which member of the group it is presently communicating with. Even in some individual call situations, an indication that the other endpoint is talking is necessary. For example, one end-point may wish to see when the other endpoint has requested and/or has been granted a speech item.

A speech item refers here to continuous speech transmission from one sender to one or more recipients. In generic duplex communications transmission is possible simultaneously in both directions. When such simultaneous communications for one reason or another are not possible, permission to talk must be separately requested and specific control mechanisms are applied to control that only one party talks at a time. Speech items are widely applied in simplex and group communications, but speech item restrictions may be applied also in duplex communications.

For basic trunked and direct mode operations, TETRA standards specify a feature that enables parties of a call to know the party they are presently listening to. This feature is used in the following as an example to illustrate in general identification of a participant in a communication procedure. European Telecommunication Standards ETSI EN 300 392-12-3; European Standard (Telecommunications series); Terrestrial Trunked Radio (TETRA); Voice plus Data (V+D); Part 12: Supplementary services stage 3; Sub-part 3: Talking Party Identification (TPI) specifies a stage 3 description of the Supplementary Service Talking Party Identification (SS-TPI) for the Terrestrial Trunked Radio (TETRA). This SS-TPI enables a listening/receiving user in an individual or a group call to be provided with identification information of the talking/sending party, and on an optional basis, with its mnemonic name and/or with the level of priority of its request for transmission grant. The SS-TPI identification information of a talking/sending party applied in the supplementary service typically corresponds with the address used by the party in its signalling messages.

Accordingly, in TETRA, when SS-TPI has been invoked for a call, the served terminal receives the SS-TPI information every time its (their) basic call state changes to Active RX. Such happens when the terminal receives a D-TX GRANTED or a D-TX INTERRUPT PDU that grants transmission permission to another or the other party. A served terminal receives the SS-TPI information in the content of a D-SETUP PDU. If SS-TPI is to be provided with a corresponding subscription parameter, like the talking/sending party mnemonic name, it is provided, if available, in an INFORM PDU. A SS-TPI terminal application in the served terminal outputs the TPI information to the user according to the conventions coded to the terminal.

Presently these conventional SS-TPI operations, however, do not operate well when trunked mode terminals participate to a call through a gateway. The reason represents the generic problem of terminal procedures that apply identification information participants of the session, i.e. use identification information received in signalling messages exchanged during procedures for the session. Such signalling messages comprise any messages carrying any session-related information, including messages for setting up or ending the session. When a DM terminal transmits through the gateway, the SS-TPI signalling applies the address of the gateway for TPI.

This is problematic, and especially so in professional use, where the communications are critical and a user immediately associates to the task assigned to him or her. For example, in case of emergency a control officer leading an operation and communicating in trunked mode in a location outside the scene of emergency needs to be directly able to identify from whom the critical communication comes. However, in most situations mere voice-based recognition fails or is not otherwise possible.

ETSI standards propose solving this problem by configuring the gateway to include the address of a transmitting direct mode terminal as a type 3 element within a layer 3 protocol data unit (PDU). This type 3 element indicates the source DM terminal when the gateway sends a message to the SwMI, or the destination DM terminal when the gateway receives a message from the SwMI. It is recommended that the DM-MS address element is included in appropriate call control and short data service PDUs when applicable.

Implementation of the proposed mechanism, however, requires essential modifications to elements in the side of the network and/or trunked mode terminals. Such modifications require a lot of design and testing work and are therefore expensive to implement. This means that since DM-MS address is an optional feature of the ETSI standards, there has so far been none or at least only very few implementations that apply the proposed use of type 3 elements in layer 3 PDUs. A simpler solution that would be easier to implement is clearly be needed to solve the problem.

The present invention proposes sending identification information directly to a destination over timeslots that are stolen from traffic channels available between the communicating parties. Accordingly, in this example, identification information applicable for talking party information is transmitted directly to the terminal that applies TPI. The TPI information derivable from the conventional control plane (C-plane) messages is complemented with information delivered as user plane (U-plane) signalling information.

In digital radio systems a physical channel provides a link at the interface between a subscriber terminal and a network. A physical channel substantially comprises a frame part of a selected multiple access technique, the frame part being allocated to data transmission between a particular subscriber terminal and the network. A physical channel can therefore comprise, for instance, one or more TDMA frame time slots arranged at a specific frequency range, or frame parts separated by means of a CDMA frame code.

Physical channels are utilized by means of various multiplexing techniques whereby logical channels are created on a physical link. The term logical channel refers to a logical data transmission bus between two or more parties, the bus being mapped on an interface between a protocol and a radio system. A mobile communications system or a part thereof can therefore comprise different types of logical channels. Logical channels are typically divided into traffic channels (TCH), which comprise different kinds of traffic relaying channels, and control channels (CCH), which comprise e.g. broadcast control channels, common control channels and dedicated control channels. Speech and circuit-switched data are transferred over the radio interface substantially on traffic channels and signalling and packet data on control channels.

A logical channel associated with a received signal can typically be concluded based on rules of the used multiplexing technique, but this does not always apply. A number of mobile communications systems allow defined deviations, for example, in some systems signalling can also be transferred on traffic channels. A burst to be transmitted in the traffic channel then typically comprises information that indicates whether transmission of traffic data or signalling takes place. The procedure of transmitting control information in a traffic channel will be hereinafter referred to as stealing.

Figure 2:
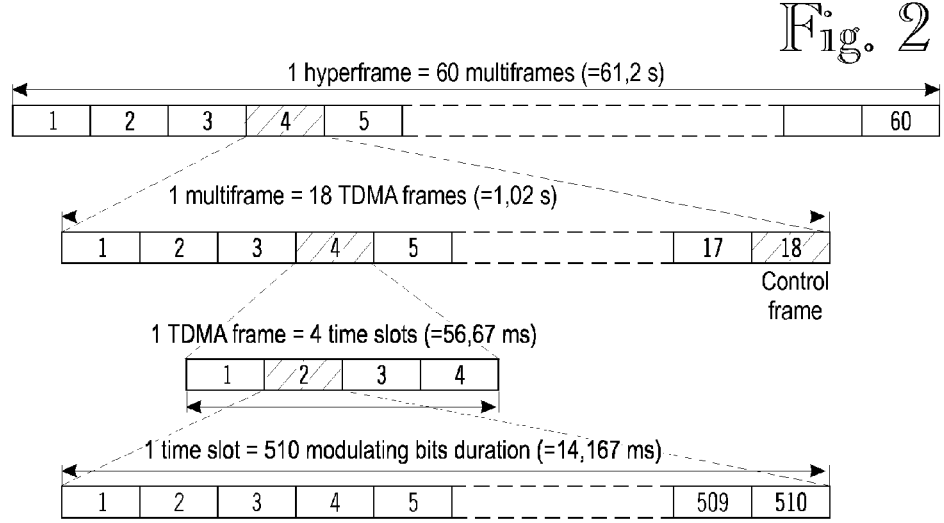
FIG. 2 shows an exemplary frame structure applied in trunked mode communications via a radio interface.

FIG. 2 shows an exemplary frame structure, applied in TETRA system trunked mode communications via TI-R. According to the ETSI specifications, the communication system employs in the air interface a basic TETRA four-slot TDMA. A hyperframe level defines the top-level frame hierarchy. One hyperframe 20 is subdivided into 60 multiframes 22, and one multiframe 22 is subdivided in 18 frames 24. The eighteenth frame in a multiframe is a control frame. One frame is subdivided into 4 time slots 26, and has duration of $170/3$ ms$\approx 56.67$ ms. For conventional phase modulation the timeslot 69 corresponds to 255 symbol duration, each one with a duration of $500/9$ μs$\approx 55.56$ μs. For Quadrature Amplitude Modulation (QAM) applied in the high-speed data transmission the timeslot is divided into 34 modulation symbol duration, each one with a duration of $5/12$ ms$\approx 416.7$ μs. The uplink timeslots may be subdivided into two subslots 38, 39.

The TETRA high-speed air interface maintains this basic TETRA time-division multiple access (TDMA) structure using four timeslots per carrier. A pair of uplink and downlink timeslots associated to a pair of uplink and downlink radio frequencies forms a physical channel. The physical channel conveys traffic and signalling messages in the form of logical channels, the interface between the higher layer protocols and the high-speed data radio subsystem.

Figure 3:
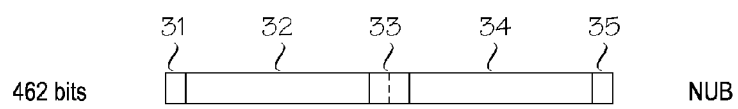
FIG. 3 illustrates uplink and downlink bursts in the embodied telecommunications system.
Figure 4:
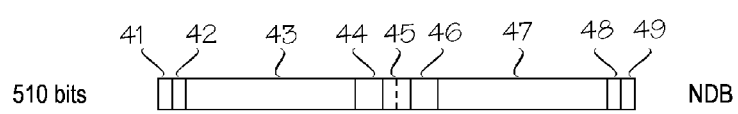
FIG. 4 illustrates uplink and downlink bursts in the embodied telecommunications system.

A burst is a sequence modulated by carrier data flow and it describes the physical contents of a time slot. In the TETRA system, eight different bursts are determined. In the following we shall examine a Normal Uplink Burst NUB, which a subscriber terminal uses for data transmission towards a base station; and a continuous Normal Downlink Burst NDB, which the base station uses for data transmission towards the subscriber terminal. Said bursts typically comprise a normal training sequence in the middle of the burst, with blocks that may comprise either traffic or control channel data on each side of the training sequence. FIGS. 3 and 4 are simplified diagrams illustrating uplink and downlink bursts in the TETRA system.

The uplink burst NUB comprises two four-bit tails 31, 35, which are used for equalisation purposes and for reducing filter transient responses at the beginning and end of the bursts. In the middle of the burst there is a normal 22-bit training sequence 33 which indicates whether the burst blocks comprise one or two logical channels. The training sequence also implicitly denotes whether the first burst block or both the blocks comprise signalling data instead of traffic data. Between the tails and the training sequences are left 216-bit data bit blocks 32 and 34.

The downlink burst NDB comprises a plural number of fields, but also this burst substantially comprises a normal training sequence 45 in the middle and, on each side of it blocks 43 and 47 that may, as mentioned, comprise traffic data or control data. In addition, the burst begins and ends with a third 22-bit training sequence 41 which is divided over the interface between two bursts so that there are 12 bits at the beginning and 10 bits at the end of a burst. The third training sequence 41 is followed by two phase control bits 452 after which comes a 216-bit data bit block 43 and 14 broadcast bits 44. The normal training sequence 45 is located in the middle of the burst and it is correspondingly followed by 16 broadcast bits 46, a 216-bit data bit block 47, phase control bits 48 and a third training sequence 49.

In the TETRA system two normal 22-bit training sequences differing from one another are defined. The training sequences are used for indicating whether the burst blocks comprise one or two logical channels, but also stealing is indicated by using a training sequence. When a burst comprises a training sequence 1, stealing is interpreted not to be in use, and the burst comprises entirely traffic channel data. When a burst comprises training sequence 2, the time slot into which the burst is mapped is interpreted to be either totally or partly stolen for signalling purposes. The MAC (Medium Access Control) header in the first half slot indicates whether the second half slot is also stolen. This mechanism applies in TETRA to both uplink and downlink transmissions.

Figure 5:
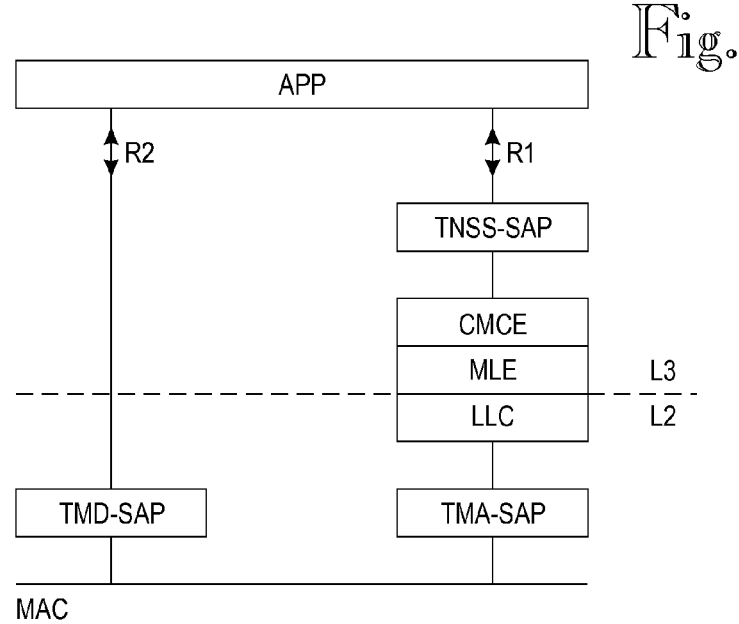
FIG. 5 illustrates routes applied in an embodiment for delivery of talking party identification information to a terminal.

FIG. 5 illustrates routes R1 and R2 applied in the present embodiment for delivery of identification information on a participant of a session to a terminal. R1 represents a conventional route where C-plane signalling arrives from medium access control (MAC) layer to logical link control (LLC) layer via TMA-SAP, and after conventional LLC and mobile link entity (MLE) arrives to circuit mode control entity (CMCE) that provides services to applications in the terminals via TNSS-SAP. Provision of these services is defined in the above mentioned ETSI document 300 392-12-3. R2 represents a new proposed route where identification information is delivered to the terminal as a U-plane signalling message via TMD-SAP.

The TMD-SAP may be used for the transfer of speech frames or circuit mode data, but it is used also if a terminal application steals from the traffic capacity to send C-plane signalling, or U-plane signalling. A U-plane signalling refers to user-to-user signalling, where a user data item is transmitted in a timeslot, of part of it, which is stolen from a channel allocated for the connection between the users. Layer 2 procedures do not need to be aware of the intended purpose of the U-plane signalling. When transmitting a slot in traffic mode, the U-plane application APP feeds half slots to layer 2 separately in a TMD-UNITDATA request primitive of TMD-SAP. The half slots of APP may comprise either U-plane traffic, or U-plane signalling. In the receiving side, for each half slot, the layer 2 shall issue to the U-plane application a TMD-UNIT-DATA indication primitive that contains any U-plane information (TCH or STCH) and indicates whether the half slot was stolen for C-plane signalling, stolen for U-plane signalling or not stolen.

In this example the application APP represents a group of one or more terminal applications that implement a terminal procedure for talking party identification in a defined call for the user of the terminal. In a terminal, signalling information is exchanged conventionally via R1 and used by APP via TNSS-SAP. In addition, the application APP is also configured to use services of TNSS-SAP to send its identification information using the U-plane signalling and/or to receive identification information of a talking party in a U-plane signalling message.

It is noted that APP is a logical entity that represents here a group of functions necessary to implement SS-TPI operations in the terminal. As well known to a person skilled in the art, APP may be implemented in many ways, for example, in a generic terminal application that directly applies services of TNSS-SAP and TMD-SAP, or as a separate application that accesses services of such generic application via a defined application interface. APP may also be implemented as a combination of an application that comprises a conventional part with functions of the conventional SS-TPI application and a GW part with functions specifically called when associated U-plane signalling is to be transmitted or applied.

Figure 6:
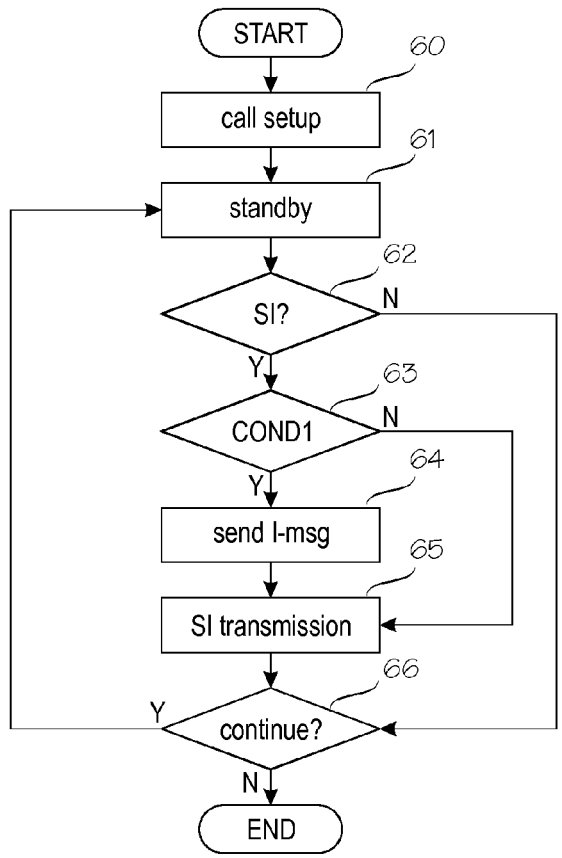
FIG. 6 illustrates steps of a procedure implemented by a direct mode terminal application during a call.

FIG. 6 illustrates steps of a procedure implemented by an application APP-TE during a call in an exemplary terminal TE3 of FIG. 1 applying the protocols and conventions of FIGS. 2 to 5. The procedure begins when the terminal is switched on and operative to exchange information over at least one of the radio interfaces of the described system. Let us assume that T3 is out of cell coverage and therefore communicates with TE4 over the DM radio interface DI-R1 and with T1 and T2 via the gateway GW that it accesses over the DM radio interface DI-R2.

When TE3 participates in a call setup it exchanges call setup signalling messages over DM radio interfaces DI-R1 and DI-R2. As a result TE3 is assigned to a defined DM channel(s) and becomes ready (step 61) to exchange information with the other participants of the call over the assigned DM channel(s). At call setup TE3 invokes also APP-TE (step 60) which becomes standby (step 61) for SS-TPI related operations. In case the user of T3 now wishes to speak, he requests a speech item (SI), for example by pressing a defined key in the user interface. If the user is the one that initiated the call, the request for a call may at the same time serve as a request for a speech item so the request for speech item is inherently recognized. Otherwise the request may be detected throughout the call as a response to a defined signal from the user interface.

If a request for speech item is detected (step 62), APP-TE checks COND1 (step 63) that represents here a criterion for separate transmission of identification information in a U-plane signalling message. In the embodied case, COND1 is met if the terminal operates in direct mode and a gateway is involved in the call. Procedures for detecting the gateway and its involvement in the call are well documented in the referred ETSI document ETS 30039-12-3. Other criteria for triggering the separate transmission may be used without deviating from the scope of protection. For example, a terminal may be configured to transmit its identification information, for example its user identity, in a U-plane signalling message at any time it operates in DMO, notwithstanding whether GW is involved or not. In any case, if the criterion is met, APP-TE applies services of TMD-SAP to code the identification information of the user in a DMAC-U-SIGNAL PDU, which is then transparently transmitted to all participants of the call (step 64). The name of the PDU in the network air interface TI-R is MAC-U-SIGNAL PDU, but the contents of the PDUs are the same. The gateway GW forwards DMAC-U-SIGNAL PDU to the network as it forwards normal traffic slots during the call.

The term transparently means here that the identification information is decoded only in the receiving peer entities. The intermediate elements and nodes, like the GW, the base station subsystems and exchanges do not know and/or need not know what the information transmitted in the PDU contains. Accordingly, no adjustments for transmitting the identification information are necessary, either. This is a significant advantage in comparison to the earlier solutions.

After the transmission in step 64, APP-TE implements any conventional operations associated to transmission of a speech item from the terminal (step 65). If the criterion COND1 is not met in step 63, step 64 is not performed, and the processing continues directly to step 65. After SI transmission APP-TE checks (step 66) whether the call still continues or not. If it does, processing returns to step 61, otherwise the procedure ends.

Figure 7:
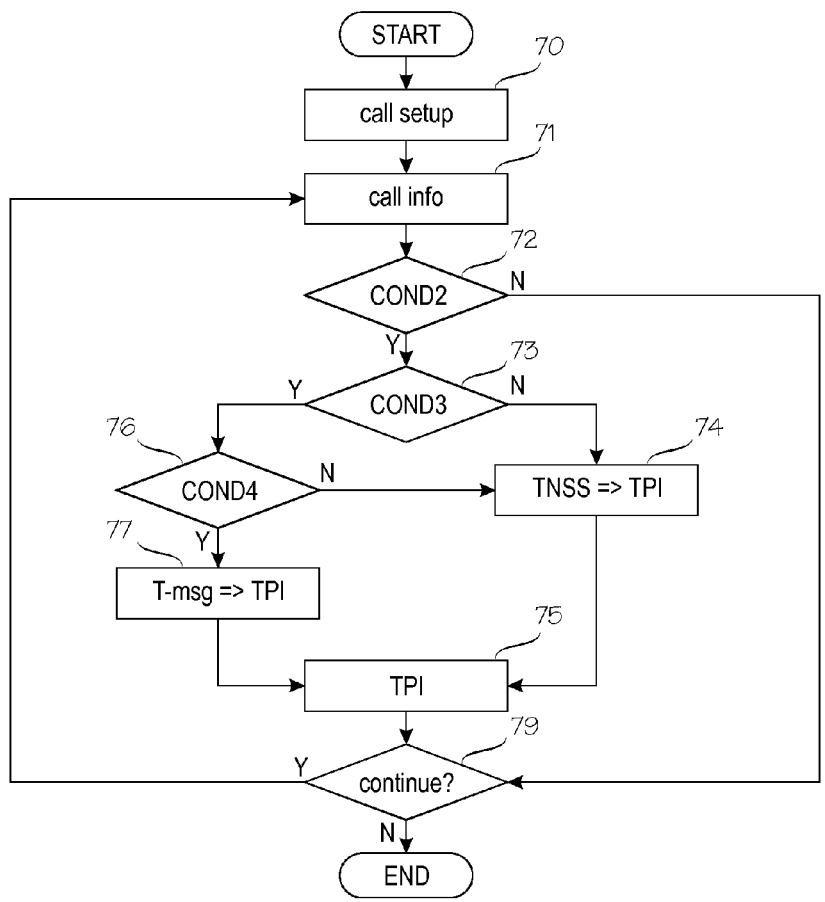
FIG. 7 illustrates steps of a procedure implemented by a trunked mode terminal application during a call.

FIG. 7 illustrates steps of a procedure implemented by an application APP-TE during a call in an exemplary terminal TE2 of FIG. 1 applying the protocols and conventions of FIGS. 2 to 5. Accordingly, the exemplary APP-TE embodied in FIGS. 6 and 7 comprises the function for transmitting TPI information in U-plane signalling messages and applying TPI information received in U-plane signalling messages. The procedures of FIGS. 6 and 7 may also be implemented in separate applications and included in terminals separately or in combination.

The procedure begins when the terminal is switched on and operative to exchange information over at least one of the radio interfaces of the described system. Let us assume that T2 communicates with the network over the TM radio interface TI-R.

When TE2 participates in a call setup it exchanges call setup signalling messages over TI-R and becomes ready to exchange information with the other participants of the call over the assigned DM channel(s). At call setup TE2 invokes also APP-TE (step 70). As shown above, after this invocation APP-TE applies services of TNSS-SAP and TMD-SAP and receives information for the SS-TPI related operations during the call (step 71).

During operations, APP-TE checks COND2 that represents here a conventional criterion for triggering retrieval and display of a talking party identification (step 72) for a speech item. If COND2 is met, APP-TE checks COND3 that represents here a criterion for need of selecting the source for talking party identification information (step 73) for the speech item. In this example, COND3 is met if TPI information delivered in at least one U-plane signalling message is available. If no such TPI information is available, the procedure may continue conventionally without further selection by applying the TPI information received via TNSS-SAP (step 74) and using it in the TPI operation for the speech item (step 75).

However, let us assume that the call is a group call involving also TE3 that is outside the coverage of the network, but is able to communicate via the DM gateway as disclosed in FIG. 6. Accordingly, when TE3 requests a speech item, TE2 receives in call information of step 71 a U-plane signalling message, MAC-U-SIGNAL PDU, a source address of which is the address of the GW but the payload of which comprises identification information of TE3.

The terminal TE2 may be configured to associate the U-plane signalling message to APP-TE on the basis of identifying the channel via which the message arrived. Alternatively, or in addition, an indication of the associated application APP-TE may be delivered in a defined application protocol data unit (APP-PDU) that comprises a header a service function of application layer to determine that the message is associated to APP-TE. If TE2 has received such MAC-U-SIGNAL PDU, it is thus received by APP-TE.

In step 73 APP-TE thus checks whether U-plane signalling message carrying associated talking party identification information has been received in step 71. If yes, APP-TE also checks COND4 that represents here a criterion for selecting identification information from the received U-plane signalling message in TPI operations associated to a speech item (step 76). In this example COND4 is met if the party requesting the speech item is the gateway from which the U-plane signalling message has been received. If COND4 is met, the identification information of T3 received in the payload of the U-plane signalling message is selected (step 77) as the talking party identification information to be applied in TPI operations of the speech item (step 77). If COND4 is not met, the procedure moves to step 74 of applying the TPI information received via TNSS-SAP and using it in the TPI operation for the speech item (step 75).

After TPI operations of the speech item, APP-TE checks whether the call is terminated (step 79). If not, the procedure returns to step 71. Otherwise the procedure ends.

In the above embodiments, the U-plane signalling message has been coded and transmitted by the transmitting party. As discussed earlier, this is advantageous, because the intermediate gateway and network elements do not need to be updated to implement the solution. However, inclusion of new features to user terminals also take time. Thus one way to expedite the availability of the correct TPI information in terminals that already support functions of APP-TE in FIG. 7 is to configure the gateway to transmit the required U-plane signalling message.

Figure 8:
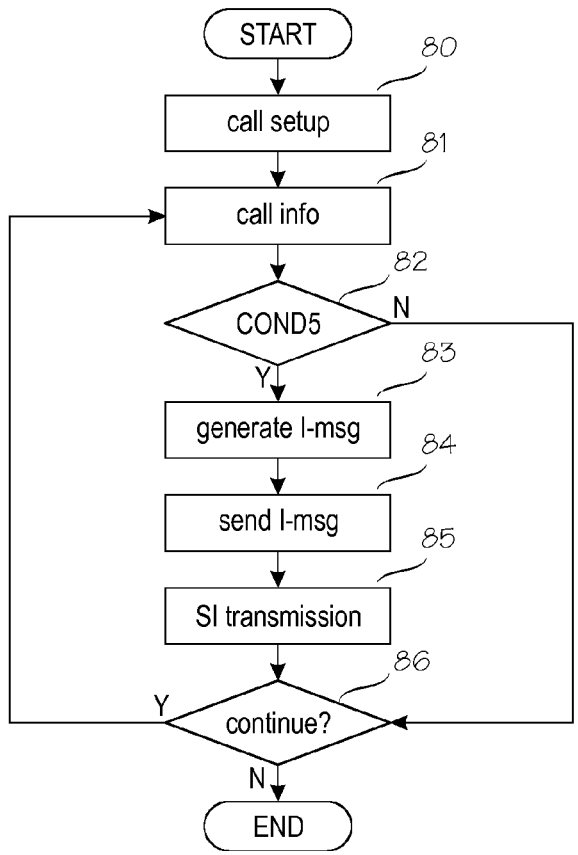
FIG. 8 illustrates steps of a procedure implemented by a gateway application during a call.

FIG. 8 illustrates steps of a procedure implemented during a call by an application APP-GW in a gateway of FIG. 1 applying the protocols and conventions of FIGS. 2 to 5. The application APP-GW represents here a group of one or more gateway applications that implement the following procedure for the talking party identification service in a defined call. APP-GW is thus a logical entity that represents a group of functions necessary to implement the procedure. As well known to a person skilled in the art, APP-GW may be implemented in many ways, for example, in a generic gateway application that directly applies any signalling information accessible to the gateway, or as a separate application that accesses services of such generic application via a defined application interface. APP-GW may also be implemented as combination of an application that comprises a conventional part with functions of the conventional gateway application and a TPI part with functions specifically called when additional U-plane signalling is to be transmitted or applied.

The procedure begins when the gateway is switched on and operative to exchange information over the at least two radio interfaces of the described system. The gateway has thus registered and authenticated to the network using its own subscriber identification. Let us assume that T3 operates under the gateway in direct mode.

If a gateway is intended to support individual calls, a process of DM terminal registration is needed. Thus, when the gateway first becomes operational it invites the DM terminals to register their presence and then forwards this information to the network. SwMI. Any DM terminal that wishes to receive individual calls from the network needs to register its presence.

If the gateway intends to support only group calls or if it is configured to support only a single DM terminal it may choose not to inform the network that it is operating as a DM gateway. The gateway may anyhow invite DM terminals in its area to register their presence so that it can identify which groups it needs to support. It does not anyhow send the list of its DM terminals to the network and does not include their individual addresses in its signalling messages with the network. Therefore, the gateway appears to the SwMI to be a normal TM terminal.

When the gateway (GW) participates in a call setup to or from a DM terminal operating under it, it exchanges call setup signalling messages with the network over TI-R and with the DM terminals, including T3, over DI-R2. At call setup GW invokes also the application APP-GW (step 80). After this invocation APP-GW receives any relevant information of the SS-TPI operations during the call (step 81), either from the TI-R or DI-R2 interface signalling.

During operation, APP-GW checks COND5 (step 82) that represents here a criterion for triggering transmission of additional identification information for talking party identification of a speech item. In this embodiment, COND5 is met, if a party to which the speech item is (to be) granted is a DM terminal T3 communicating with the network via GW. If COND5 is not met, the procedure proceeds directly to step 85 where transmissions of the speech item are implemented in a conventional way.

If COND5 is met, GW codes the identification information of the DM terminal T3 into the payload of a U-plane signalling message (step 83) and transmits it in a timeslot at least part of which is stolen from voice traffic (step 84) as described above. After this conventional transmissions of the speech item may be performed (step 85) in a normal manner. After them APP-GW checks (step 86) whether the call continues with another speech item, or whether the call ends. If the call continues, the procedure moves back to step 81.

The identification information of the DM terminal T3 in the U-Plane signalling information of APP-GW may be used for TPI by the peer terminals that operate over the TI-R in a manner disclosed in FIG. 7.

The disclosed solution provides a simple and straightforward mechanism for transmission of talking party identification information. The required identification information may be delivered by adjustments made only to the peer parties, the talking and the displaying terminals. The proposed methods are thus technically much easier to implement than prior art solutions.

It is noted that TPI has been used here only as an example of various terminal procedures that are associated to communication sessions and where address of a participant is applied. The invented arrangement is applicable in a number of other terminal procedures, like calling party identification, among others.

As an example, when a direct mode terminal initiates a call via a direct mode gateway, the network operations may respond quickly, which means the uplink is available before the gateway has any user traffic to transmit. In the meantime, in the absence of genuine traffic, the direct mode gateway typically generates null PDUs on the uplink. Advantageously one of these null PDUs could be replaced by a MAC-U-SIGNAL PDU that carries identification information of the direct mode terminal T3. The identification information would then be available to the receiving terminal very early, before any user data is exchanged. Identification information of T3 could then be applied in terminal procedures for calling party identification. This way the user of the receiving terminal would know that the incoming call is from T3, and not be confused by display of gateway address. A person skilled in the art is able to easily generate other use cases and embodiments for the inventive idea.

It is also noted that in the specific case of TPI the association between the conventional TPI signalling message and delivery of the identity used by T3 is preferably imminent such that TPI information is transmitted in user plane signalling message for each granted speech item. Practically the user plane signalling message delivery may actually need to be repeated at times even during a speech item in order to allow new participants to receive the TPI information as soon as possible. Other type of association may be applied without deviating from the scope of protection.

Figure 9:
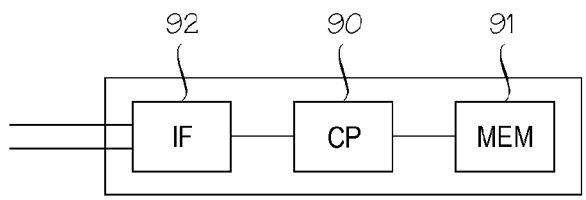
FIG. 9 shows a block diagram illustrating an exemplary apparatus for implementing the procedures in FIGS. 6 to 8.

The exemplary embodiments of this invention also comprise an apparatus for a terminal and for a gateway in addition to prior art means and also comprise means for implementing the above mentioned methods. FIG. 9 shows a block diagram illustrating an exemplary apparatus for the purpose. It is noted that any type of user terminals may be applied without deviating from the scope of protection. For example, in TETRA systems, the various types of dispatcher workstations and platforms running dispatching applications are considered as user terminals.

The apparatus comprises a processor unit 90 for performing systematic execution of operations upon data. The processor unit 90 is an element that essentially comprises one or more arithmetic logic units, a number of special registers and control circuits. Memory unit 91, data medium where computer-readable data or programs, or user data can be stored, is connected to the processor unit 90. The memory unit 91 typically comprises volatile or non-volatile memory, for example EEPROM, ROM, PROM, RAM, DRAM, SRAM, firmware, programmable logic, etc.

The apparatus also comprises an interface unit 92 with at least one input unit for inputting data to the internal processes of the apparatus and at least one output unit for outputting data from the internal processes of the apparatus. If a line interface is applied, the interface unit typically comprises plug-in units acting as a gateway for information delivered to its external connection points and for information fed to the lines connected to its external connection points. If a radio interface is applied, the interface unit typically comprises a radio transceiver unit, which includes a transmitter and a receiver, and is also electrically connected to a processing unit 90. The transmitter of the radio transceiver unit receives a bitstream from the processing unit 90, and converts it to a radio signal for transmission by the antenna. Correspondingly, the radio signals received by the antenna are led to the receiver of the radio transceiver unit, which converts the radio signal into a bitstream that is forwarded for further processing to the processing unit 90. Different radio interfaces may be implemented with one radio transceiver unit, or separate radio transceiver units may be provided for the different radio interfaces. The interface unit of the apparatus may also comprise a user interface with a keypad, a touch screen, a microphone, and equals for inputting data and a screen, a touch screen, a loudspeaker, and equals for outputting data.

The processor unit 90, the memory unit 91, and the interface unit 92 are electrically interconnected to perform systematic execution of operations on the received and/or stored data according to the predefined, essentially programmed processes of the apparatus. These operations comprise the procedures for delivery of identification information, which have been described in more detail with FIGS. 1 to 8.

In general, various embodiments of the apparatus may be implemented in hardware or special purpose circuits, software, logic or any combination thereof. Some aspects may be implemented in hardware, while some other aspects may be implemented in firmware or software, which may be executed by a controller, microprocessor or other computing device. Software routines, which are also called as program products, are articles of manufacture and can be stored in any apparatus-readable data storage medium and they include program instructions to perform particular tasks. Thus the exemplary embodiments of this invention also provide a computer program product, readable by a computer and encoding instructions for executing a process for delivery of talking party identification information in the apparatus of FIG. 9.

While various aspects of the invention may be illustrated and described as block diagrams, message flow diagrams, flow charts and logic flow diagrams, or using some other pictorial representation, it is well understood that the illustrated units, blocks, apparatus, system elements, procedures and methods may be implemented in, for example, hardware, software, firmware, special purpose circuits or logic, a computing device or some combination thereof. Furthermore, it will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
implementing in a communications network a communication session between a group of participants, the group of participants comprising at least a first terminal that operates in direct mode and a second terminal that operates in trunked mode;
mediating communications of the first terminal via a direct mode gateway such that messages of the first terminal are addressed in the communications network with identification information of the direct mode gateway;
implementing in the second terminal a terminal procedure that applies identification information of a participant of the session;
delivering identification information of the first terminal to the second terminal in a payload of a user plane signalling message of the communication session, the user plane signalling message being a signalling message that comprises address information for routing purposes, transmits control information, including the identification information of the first terminal, in the payload and steals, for the control information, communication resource from user plane traffic messages of the communication session;

using in the terminal procedure the identification information of the first terminal delivered in the payload of the user plane signalling message instead of the address information.

2. A method as claimed in claim 1, the method further comprising:

communicating in the communications network over a time-divisioned multiple access radio interface; and the user plane signalling message stealing at least a half of a timeslot from a channel assigned to the communication session.

3. A method as claimed in claim 1, wherein the terminal procedure comprises talking party identification or calling party identification.

4. A method as claimed in claim 1, wherein the messages of the first terminal comprises messages from the first terminal and messages to the first terminal such that a source address in messages from the first terminal comprises an identity of the direct mode gateway, and a target address in messages to the first terminal comprises the identity of the direct mode gateway.

5. A method as claimed in claim 1, the method further comprising delivering the user plane signalling message of the communication session from the first terminal to the second terminal.

6. A method as claimed in claim 1, the method further comprising delivering the user plane signalling message of the communication session from the direct mode gateway to the second terminal.

7. A terminal for a communications network, the terminal comprising:

at least one processor;

at least one memory including computer program code; and at least one interface unit;

the at least one memory and the computer program code configured to, with the at least one processor, cause the terminal at least to:

operate in direct mode;

communicate with a trunked mode terminal via a direct mode gateway such that messages of the terminal in the communications network side are addressed with an address of the direct mode gateway;

send identification information of the terminal to the trunked mode terminal in a payload of a user plane signalling message of a communication session, the user plane signalling message being a signalling message that comprises address information for routing purposes, transmits control information, including the identification information of the first terminal, in the payload and steals, for the control information, communication resource from user plane traffic messages of the communication session, wherein the trunked mode terminal uses in a terminal procedure the identification information sent in the payload of the user plane signalling message instead of the address information.

8. A terminal as claimed in claim 7, wherein the identification information comprises a subscriber identity in use by terminal.

9. A terminal for a communications network, the terminal comprising:

at least one processor;

at least one memory including computer program code; and at least one interface unit;

the at least one memory and the computer program code configured to, with the at least one processor, cause the terminal at least to:

implement a communication session;

perform a terminal procedure applying identification information of a participant of the communication session;

receive the identification information of the other terminal in a payload of a user plane signalling message of the communication session, the user plane signalling message being a signalling message that comprises address information for routing purposes, transmits control information, including the identification information of the first terminal, in the payload and steals, for the control information, communication resource from user plane traffic messages of the communication session; and use in the terminal procedure the identification information of the other terminal received in the payload of the user plane signalling message instead of a source address of the user plane signaling message.

10. A terminal as claimed in claim 9, wherein the identification information of the other terminal comprises a subscriber identity used by the other terminal.

11. A direct mode gateway for a communications network, comprising:

at least one processor;

at least one memory including computer program code; and at least one interface unit;

the at least one memory and the computer program code configured to, with the at least one processor and the at least one interface unit, cause the direct mode gateway at least to:

communicate with terminals in direct mode and terminals in trunked mode;

mediate communications of a first terminal such that messages of the first terminal are addressed in the communications network with identification information of the direct mode gateway;

deliver the identification information of the first terminal to a second terminal in a payload of a user plane signalling message of the communication session, the user plane signalling message being a signalling message that uses addressing information for routing purposes, the addressing information comprising as an address of the first terminal the address of the direct mode gateway, transmits control information, including the identification information of the first terminal, in the payload and steals, for the control information, communication resource from user plane traffic messages of the communication session, wherein the second terminal uses in a terminal procedure the identification information of the first terminal delivered in the payload of the user plane signalling message instead of the address information.

12. A direct mode gateway as claimed in claim 11, wherein the identification information of the first terminal comprises a subscriber identity used by the first terminal.

13. A communications system comprising:
a first terminal and a second terminal;
a direct mode gateway configured to mediate communications of the first terminal in direct mode such that messages of the first terminal are addressed in the communications network with identification information of the direct mode gateway;
the second terminal is configured to implement a terminal procedure applying identification information of a participant of the communication session;
the first terminal or the direct mode gateway is configured to deliver identification information of the first terminal to the second terminal in a payload of a user plane signalling message of the communication session, the user plane signalling message being a signalling message that uses addressing information for routing purposes, transmits control information, including the identification information of the first terminal, in the payload and steals, for the control information, communication resource from user plane traffic messages of the communication session;
the second terminal is configured to use in the terminal procedure the identification information of the first terminal received in the payload of the user plane signalling message instead of a source address of the user plane signaling message.

14. A computer program product embodied in an apparatus-readable non-transitory medium and comprising program instructions, wherein execution of said program instructions causes an apparatus containing the computer program product to participate in a communications network in a communication session between a group of participants and to perform one of processes comprising a first terminal process, a second terminal process and a gateway process, wherein
the first terminal process comprises:
operating in a direct mode;
communicating with a trunked mode terminal via a direct mode gateway such that messages of the terminal in the communications network side are addressed with an address of the direct mode gateway;
sending identification information of the terminal to the trunked mode terminal in a payload of a user plane signalling message of a communication session, the user plane signalling message being a signalling message that uses addressing information for routing purposes, transmits control information, including the identification information of the first terminal, in the payload and steals, for the control information, communication resource from user plane traffic messages of the communication session;
the second terminal process comprises:
operating in a trunked mode;
performing a terminal procedure applying identification information of a participant of the communication session;
receiving identification information of the direct mode terminal in the payload of the user plane signalling message of the communication session;
using in the terminal procedure the identification information of the other terminal received in the payload of the user plane signalling message instead of the source address of the user plane signaling message; and
the gateway process comprises:
communicating with terminals in direct mode and terminals in trunked mode;
mediating communications of a first terminal operating in direct mode via a direct mode gateway such that messages of the first terminal are addressed in the communications network with identification information of the direct mode gateway;
delivering identification information of the first terminal to a second terminal operating in trunked mode in the payload of the user plane signalling message of the communication session, the user plane signaling message comprising as an address information of the first terminal the identification information of the direct mode gateway.

15. A computer program product as claimed in claim 14, wherein
execution of said program instructions further causes the apparatus containing the computer program product to communicate in the communications network over a time-divisioned multiple access radio interface, and
the user plane signalling message steals at least a half of a timeslot from a channel assigned to the communication session.

16. A computer program product as claimed in claim 14, wherein the terminal procedure comprises talking party identification or calling party identification.

17. A computer program product as claimed in claim 14, wherein the messages of the first terminal comprises messages from the first terminal and messages to the first terminal such that a source address in messages from the first terminal comprises an identity of the direct mode gateway, and a target address in messages to the first terminal comprises the identity of the direct mode gateway.

18. A computer program product as claimed in claim 14, wherein execution of said program instructions further causes the apparatus, when the apparatus performs the gateway process, to deliver the user plane signalling message of the communication session from the direct mode gateway to the second terminal.

* * * * *